United States Patent Office 3,517,571
Patented June 30, 1970

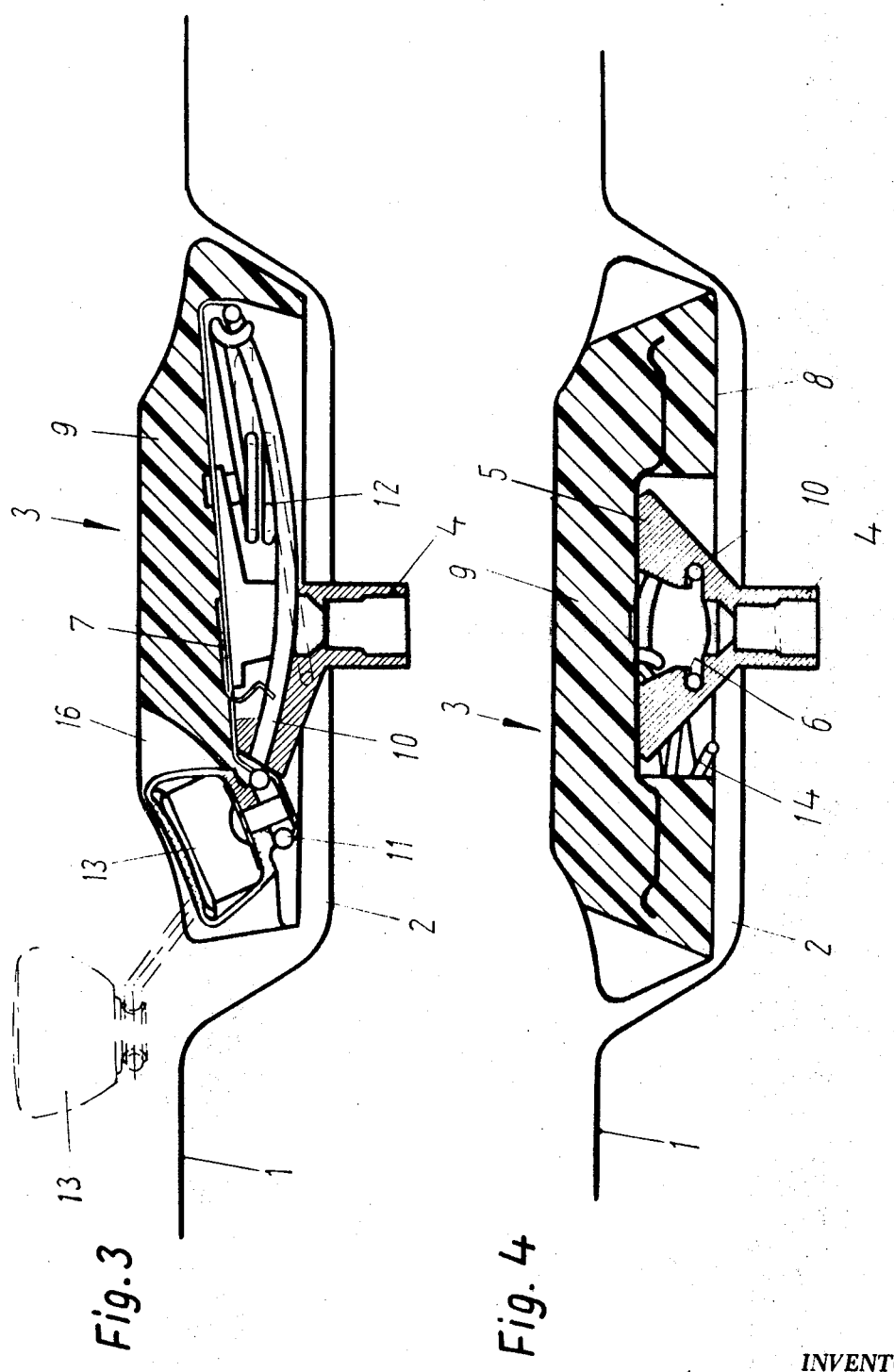

3,517,571
RETRACTABLE CRANK FOR THE MANUAL ACTUATION OF AN OPENING AND CLOSING DEVICE
Willi O. Treber and Siegfried Nothacker, Wuppertal-Elberfeld, Germany, assignors to Gebr. Happich G.m.b.H., Wuppertal-Elberfeld, Germany
Filed Aug. 9, 1968, Ser. No. 751,603
Claims priority, application Germany, Aug. 31, 1967, H 63,756
Int. Cl. G05g 1/08, 1/10
U.S. Cl. 74—547        11 Claims

ABSTRACT OF THE DISCLOSURE

A crank for opening and closing devices such as automobile windows or sliding roofs is provided with a retractable crank arm and a handwheel. The crank arm is mounted within the handwheel and is spring biased into the handwheel so that at rest the crank arm is held in the handwheel with the knob at the end of the crank arm positioned in a niche in the handwheel. The crank arm is generally U-shaped whereby the spring may be conveniently attached thereto and it has a curvature so that upon the pulling of the crank arm radially out of the handwheel, the knob moves away from the plane of the handwheel.

---

The present invention relates to a retractable crank for the manual actuation of an opening and closing device intended in particular for automotive vehicles. Such hand cranks are used in particular in automotive vehicles for actuating the actuating devices of windows or sliding roofs.

Cranks for these purposes are presently available and are generally of the hinged handle type in which the crank arm consists of two parts which are pivotally connected with each other. When not used, this type of crank can be swung into a recess extending from the inner wall of the car. In this connection, it has been found, however, that the crank arm, due to its bipartite development, does not assure a sufficiently dependable operating of the crank. Furthermore, there is the danger that even when the crank is swung into the recess, one can injure oneself by an accidental blow against the knob which is provided as a handle on the free end of the crank. The danger of injury is present, since the knob lies relatively free within the recess which also receives the hingeable part of the crank arm and its flat end surface furthermore does not extend parallel, but rather at an angle of inclination, to the surface formed by the inner wall of the vehicle. Thus the edge of the knob which produces injury upon impact lies, in part, in the direction of a possible impact.

The object of the present invention is to avoid the said disadvantages and provide a crank which can be retracted into a position of rest and which is of a construction which is simple and stable in use, as well as easy to produce.

In a preferred embodiment of the instant invention the crank is arranged in a niche of a handwheel from which it can be pulled out against the action of a spring. Thus when used, the crank need merely temporarily be pulled out of the niche, and upon release will automatically return into its retracted position, in which it remains when not used. Furthermore, in its retracted position the knob, on the crank, is below the upper surface of the niche in which it resides and accidental impact with the knob is thereby prevented.

As a particularly advantageous feature of the instant invention, the crank handle is arranged in a handwheel which is connected firmly for rotation with the drive pin of the device being actuated. In this way the possibility is created of using the approximately palm-size handwheel for the fine adjustment (usually less than one-half revolution of the drive pin being actuated) and using the crank which is incorporated in the handwheel for the coarse adjustment of the apparatus. By coarse adjustment is meant that the device being moved is to be displaced over a long distance with several rotations of its drive pin being necessary. The crank is considerably better suited for many revolutions due to its handy knob which is arranged for rotation on the crank arm and which need not be released even upon several revolutions of the crank, while the approximately palm-size handwheel, which is seatedly connected firmly in rotation directly on the drive pin of the apparatus, requires at least one regripping after every half revolution (ideal for fine adjustment). In addition to this, as a result of this combination of crank and handwheel, there is advantageously created the possibility of combining individual parts directly at their place of manufacture into a single structural part which need then only be placed on its drive pin at the place of assembly of the opening and closing device.

Preferably, the arm of the crank consists of a U-shaped piece, such as a wire loop, which is guided for defined movement within a supporting body connected with the drive pin of the operated device. The U-shaped member can be produced in a simple and economical manner by mere bending of a length of wire and, furthermore, in its development as a single-piece rigid crank arm, represents a force transmission element which is stable in use.

It has proven particularly advantageous for the U-shaped member, in accordance with the invention, to have a curved or arcuate profile, convex with respect to the drive pin side of the entire crank assembly. There are two advantages to this construction. First, and as will be explained in greater detail, the U-shaped member and knob thereon will, when in the rest position, lie below the upper surface of the handwheel within which they reside. This prevents accidental injury by hitting the knob. Second the U-shaped member and knob when pulled out to the extended position will automatically rise above the handwheel making them easier to grasp. In summary, there is obtained an advantageous flat, compact construction for the crank and its housing, while at the same time the crank, in position of use, is at a sufficiently large distance from the fastening wall to operate it conveniently.

Finally, a particularly preferred construction employs a compression spring arranged between the end of the U-shaped member and the supporting body, which spring, in accordance with another feature of the instant invention, is connected in simple detachable manner with the U-shaped member and the bearing body.

All the above objects and a fuller understanding of the invention may be had by referring to the following description and drawings, in which:

FIG. 3 shows the handwheel with crank arranged in the recess in a fastening wall, seen in section along the line III—III of FIG. 1; and FIG. 4 shows the handwheel with crank arranged in the recess in a fastening wall, seen in section along the line IV—IV of FIG. 1.

Figure 1:
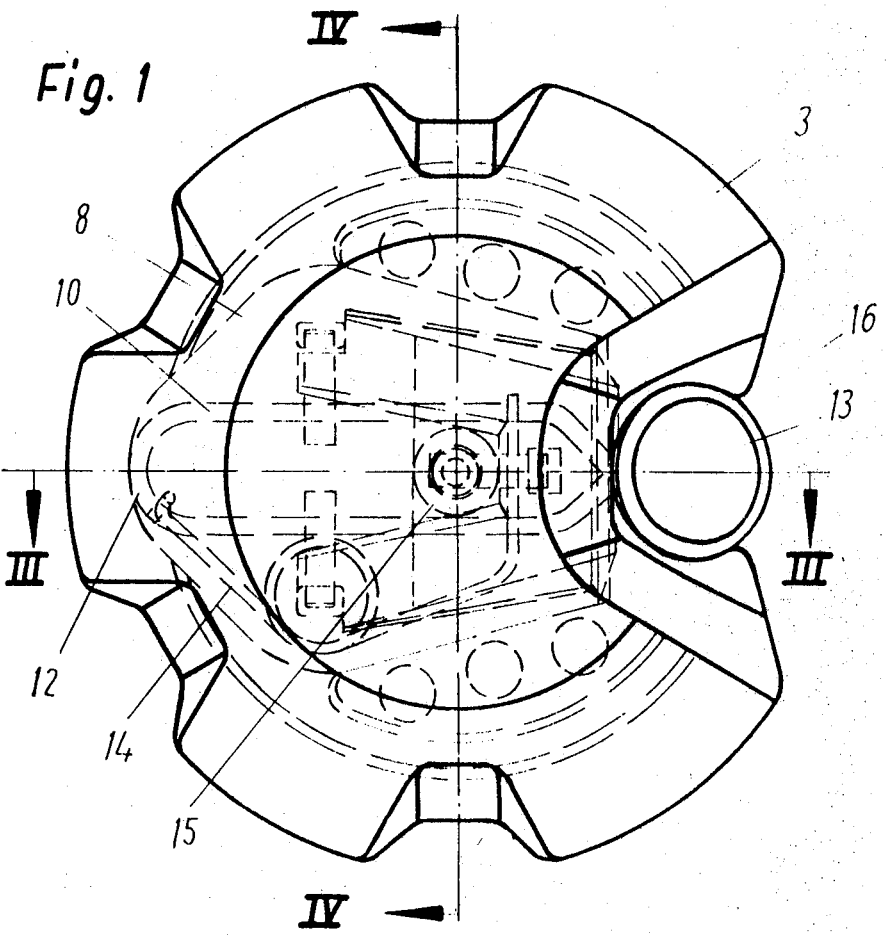
FIG. 1 shows the operating side of a handwheel provided with built-in crank.

In the recess 2 formed in the fastening wall 1 (FIGS. 3 and 4) there is arranged a handwheel 3 whose hub 4 can be connected for rotation with the drive pin of a device (not shown) for the opening and closing of, for instance, windows or sliding roofs in automotive vehicles. The hub 4 extends from a bearing body 5 which is fastened by means of suspended spring strips 7 (FIG. 2) to a preferably metal support 8. The support 8 is embedded in a cushion 9 consisting preferably of foam plastic.

The crank consists of a U-shaped member 10 developed from a loop of wire bent into hairpin shape and of a knob 13 serving as handle. The U-shaped member 10 is guided in a slot 6 of the bearing body 5. The end of the U-shaped member 10 extending out of the bearing body 5 is shaped into an eye 11 which bears in rotatable fashion the knob 13. The U-shaped member 10 which is cured toward the operating side of the handwheel 3 is held in the slot 6 of the bearing body 5 under the action of a compression spring 14 which is fastened in detachable manner, on the one hand, to the end 12 of the U-shaped member and, on the other hand, to the bearing body 5, in such a manner that the knob 13, shown in FIGS. 1 and 3, is biased to a rest position within the niche 16 provided in the handwheel 3.

Figure 2:
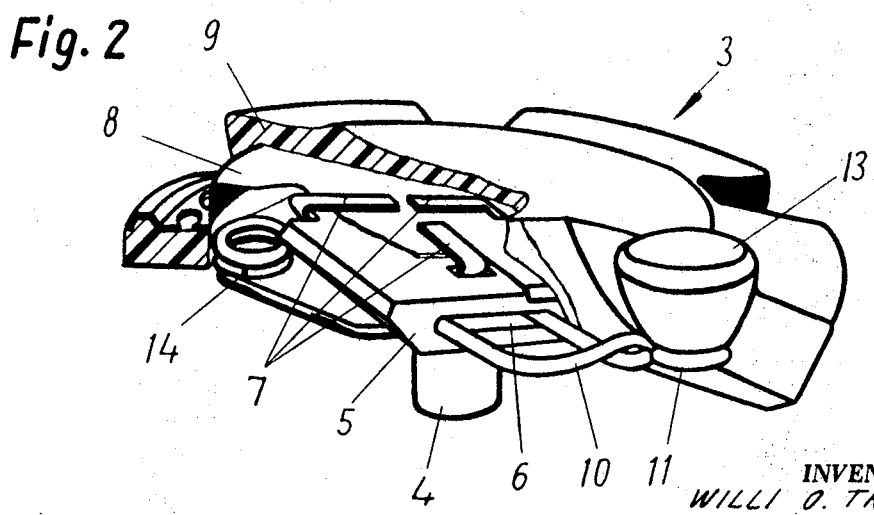
FIG. 2 shows in perspective and partially in section the handwheel and the crank which is in position of use.

The crank is brought into its position of use, shown in FIG. 2, by pulling the U-shaped member 10, against the action of the compression spring 14, out of the slot 6 of the bearing body 5, during which motion the knob 13 leaves the protective niche 16 and passes into the position shown in dotted line in FIG. 3. The motion necessary for the pulling out of the U-shaped member, which motion is directly radially outward with respect to the handwheel 3, is limited by a roller-like stop 15 (FIG. 1) which is arranged within the slot 6 and against which the end 12 of the U-shaped member strikes.

The torque produced by rotation of the handwheel or crank is transmitted via the hub 4 to the drive pin of the adjusting device. If the closure part, for instance, a window or sliding roof, is to be displaced over a large distance for which several revolutions of the drive pin are necessary, the adjustment device is advisedly actuated by the crank. Only for small displacements which require a rotation of the drive pin of less than 360 degrees is the handwheel used.

It is to be understood that although the instant invention has been described with respect to rotating a device which controls the movement of automobile windows and sliding roofs; the invention has application in any environment in which it is desirable to impart rotation to some object.

Although there has been descrbed a preferred embodiment of this novel invention, many variations and modifications will now be apparent to those skilled in the art.

We claim:

1. A crank for generating rotational motion of an object, said crank comprising:
   a housing adapted to be secured to said object for rotation therewith; said housing comprises a handgraspable handwheel adapted to be rotated independently of said crank arm;
   a crank handle guidingly supported within said housing;
   said crank handle movable between a first position wherein a substantial portion of said crank handle is within said housing and a second, operative position wherein a substantial portion of said crank handle is extending out of said housing;
   rotation of said crank handle imparting rotation to said housing;
   said crank handle having knob means provided at an end thereof which remains out of said housing even when said crank arm is in its first position and wherein said housing has a niche along its outer periphery to receive said knob when said crank arm is in its first position.

2. The crank of claim 1, wherein said crank handle is slidable, substantially axially, into and out of said housing.

3. The crank of claim 1, wherein said handwheel includes a plurality of indentations along the outer periphery thereof to facilitate the grasping thereof.

4. The crank of claim 1, wherein said handwheel includes a plurality of indentations along the outer periphery thereof to facilitate the grasping thereof.

5. The crank of claim 1, and further including biasing means for urging said crank handle toward its first position such that said knob will be urged toward a resting position within said niche.

6. The crank of claim 5, wherein said knob has a top and bottom surface, said bottom surface secured to said crank handle, said top surface lying lower than the upper surface of said handwheel when said knob occupies its rest position within said niche, whereby the possibility of accidentally striking the top surface of said knob is reduced.

7. The crank of claim 6, wherein said crank handle has an arcuate profile, curved away from the object to be rotated whereby said top surface of said knob will lie above the upper surface of said housing when said handle is in its second position.

8. A crank for generating rotational motion of an object, said crank comprising:
   a housing adapted to be secured to said object for rotation therewith;
   a crank handle guidingly supported within said housing;
   said crank handle movable between a first position wherein a substantial portion of said crank handle is within said housing and a second, operative position wherein a substantial portion of said crank handle is extending out of said housing;
   said crank handle is a generally U-shaped member having a bight-portion which always resides within said housing;
   rotation of said crank handle imparting rotation to said housing.

9. The crank of claim 8, and further including biasing means secured at one end thereof to said bight-portion and at the other end thereof to said housing for urging said crank handle toward its said first position.

10. The crank of claim 8, wherein said housing has an internal passageway therethrough which guidingly supports said crank handle for movement between its first and second position, and further including stop means positioned in said passageway for cooperatively engaging said bight-portion and thereby preventing said crank handle from travelling beyond its said second position.

11. A crank for generating rotational motion of an object, said crank comprising:
   a housing adapted to be secured to said object for rotation therewith;
   a crank handle guidingly supported within said housing.
   said crank handle movable between a first position wherein a substantial portion of said crank handle is within said housing and a second, operative position wherein a substantial portion of said crank handle is extending out of said housing;
   said crank handle has an arcuate profile, curved away from the object to be rotated whereby said crank handle will be easily accessible.

References Cited

UNITED STATES PATENTS

| | | | |
|---|---|---|---|
| 498,104 | 5/1893 | Buck | 74—547 XR |
| 2,455,819 | 12/1948 | Smith | 74—546 XR |
| 2,727,406 | 12/1955 | Opocensky | 74—547 XR |
| 3,383,945 | 5/1968 | Carella | 74—547 |

FRED C. MATTERN, Jr., Primary Examiner

F. D. SHOEMAKER, Assistant Examiner